J. M. WILSON.
URINALS.
No. 180,689. Patented Aug. 1, 1876.
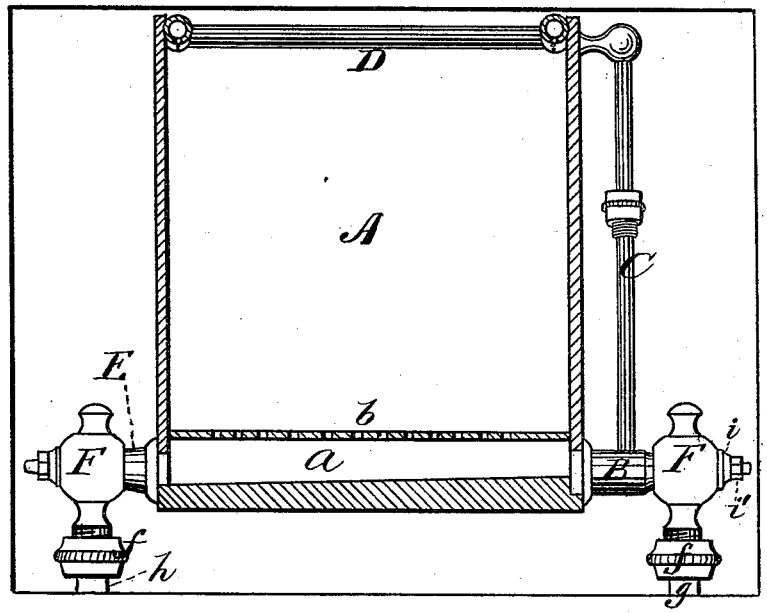
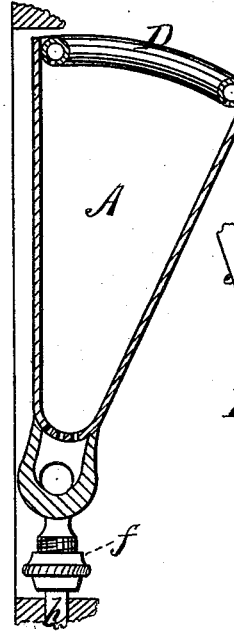
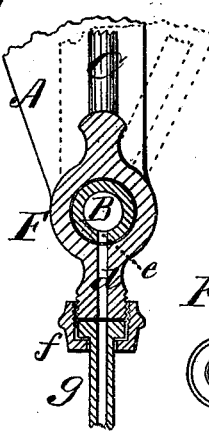
WITNESSES
Thomas Bernard
Francis J. Mass
INVENTOR
J. M. Wilson
by E. W. Anderson
ATTORNEY

UNITED STATES PATENT OFFICE.

JOSEPH M. WILSON, OF PHILADELPHIA, PENNSYLVANIA, ASSIGNOR OF ONE-HALF HIS RIGHT TO WASHINGTON P. OGLESBY, OF SAME PLACE.

IMPROVEMENT IN URINALS.

Specification forming part of Letters Patent No. 180,689, dated August 1, 1876; application filed April 22, 1876.

*To all whom it may concern:*

Be it known that I, JOSEPH M. WILSON, of Philadelphia, in the county of Philadelphia and State of Pennsylvania, have invented a new and valuable Improvement in Urinals; and do hereby declare that the following is a full, clear, and exact description of the construction and operation of the same, reference being had to the annexed drawings, making a part of this specification, and to the letters and figures of reference marked thereon.

Figure 1 of the drawings is a representation of a longitudinal vertical section of my improved urinal. Fig. 2 is a cross-section thereof. Fig. 3 is a vertical section through the cock F. Fig. 4 is an end view thereof, and Fig. 5 is a detail.

This invention has relation to improvements in urinals.

The object of the invention is to cut off and let on a flow of water from a feed-pipe opening into the urinal without using hand-cocks.

The nature of the invention consists in a urinal connected with a feed and a waste pipe, and capable of vertical vibration relative thereto, such vibration having the effect of opening or closing the connection of the feed-pipe with the receptacle, thus letting on or cutting off the flow of the water to the urinal, as will be hereinafter more fully explained.

In the annexed drawings, the letter A designates a wedge-shaped vessel or basin, having at its lower edge a cylindrical tubular enlargement, $a$, separated from the body of the vessel by a sieve or strainer, $b$. This vessel is provided at one end with a tubular induct, B, connected, by means of a pipe, C, with a rinsing-pipe, D, running around the upper edge of the vessel, and provided upon its under side with openings, for a purpose hereinafter explained, and at the other with a similar tubular educt, E, which, as well as the induct, tapers slightly outward, and is rabbeted and screw-threaded upon its outer end.

F represent suitable cocks, which are passed upon the induct and educt D E, and the opening in which is tapered to conform to the shape of the said educt and induct. Cock F at the right of Fig. 1 is provided with a duct, $d$, which registers with a perforation, $e$, in the induct, and it is connected, by the usual coupling $f$, with a rigid feed-pipe, $g$. The other cock F is also coupled to a waste-pipe, $h$, of suitable rigidity, and the vessel is adequately supported thereon, pipes $g\ h$ being immovably fixed to a wall or other surface on the premises. The educt and induct are thus endowed with the functions of journals, and the cocks with those of bearings, the latter being fixed and the former capable of vibrating freely thereon. Consequently the flow of water into the vessel may be stopped by imparting to vessel a slight vibration, the effect of which would be to throw the duct $d$ out of line with the perforation $e$.

The urinal may be set in a niche of the wall, and, when thus arranged, may be thrust back with one of its faces in the plane of the face of the wall. In general, however, I prefer to place it upon the inside of wash-stand or other doors, which, when opened, will bring the urinal into proper position for use.

Cocks F are held in place upon their journals by means of non-rotating washers $i$ and nuts $i'$, which latter, when set up, will force the cocks up on the said journals, and thereby take up the wear occasioned by the movements of the urinal in shutting off and letting on the water.

The draw-off cock F at the left of Fig. 1 is of the same construction as the feed-water cock, except that the educt-journal E will be provided with an elongated transverse slot instead of a perforation, $e$, and will consequently be always open.

The operation is as follows: The vessel having been swung out from the wall, the feed-cock will be opened and the water forced up pipe C into the rinsing-tube D upon the upper edge of the vessel, and will pour through its cleft or perforated under side down the walls of the vessel, which is now ready for use. After being used the vessel is thrust back, closing the feed-cock and cutting off the water-supply, when its contents will be drained off through educt E and pipe $h$.

What I claim as new, and desire to secure by Letters Patent, is—

1. The combination of a vibrating vessel, A, having tubular journals E B, with perforations e and the stationary feed and waste cocks F, the former having duct d, substantially as specified.

2. The combination, with the stationary cock F, journal-induct B, and the pipe C, opening into the said induct, of the vibratory vessel A, having rinsing-pipe D around its upper edge, substantially as specified.

In testimony that I claim the above I have hereunto subscribed my name in the presence of two witnesses.

JOS. M. WILSON.

Witnesses:
GEO. C. SHELMERDINE,
E. L. PERDRIAUX.